US00RE36285E

United States Patent [19]

Stansfeld et al.

[11] E Patent Number: Re. 36,285

[45] Reissued Date of Patent: Aug. 31, 1999

[54] THERMOCOUPLE PROBE

[75] Inventors: James Wolryche Stansfeld, Beech; Eric Metcalf, Ropley, both of United Kingdom

[73] Assignee: Solartron Group Limited, Farnborough, United Kingdom

[21] Appl. No.: 09/024,743

[22] Filed: Feb. 17, 1998

Related U.S. Patent Documents

Reissue of:

[64] Patent No.: 5,678,926
Issued: Oct. 21, 1997
Appl. No.: 09/353,102
Filed: Dec. 9, 1994

U.S. Applications:

[62] Division of application No. 08/142,184, Oct. 26, 1993, Pat. No. 5,423,610.

[30] Foreign Application Priority Data

Oct. 30, 1992 [GB] United Kingdom ..... 92 22811

[51] Int. Cl.[6] ..... G01K 1/14

[52] U.S. Cl. ..... 374/208; 374/148; 73/866.5; 136/230

[58] Field of Search ..... 374/148, 208, 374/179; 136/230; 73/866.5

[56] References Cited

U.S. PATENT DOCUMENTS

| | | | |
|---|---|---|---|
| 3,802,926 | 4/1974 | Blencowe | 136/230 |
| 3,845,706 | 11/1974 | Strimple et al. | 136/232 |
| 3,970,481 | 7/1976 | Stroik | 136/230 |
| 4,001,045 | 1/1977 | Smith | 136/230 |
| 4,244,221 | 1/1981 | Scott . | |
| 4,467,134 | 8/1984 | Pustell | 136/230 |
| 4,999,330 | 3/1991 | Pustell | 136/230 |
| 5,141,335 | 8/1992 | Wannamaker et al. | 374/179 |
| 5,146,796 | 9/1992 | Mailliet et al. | 374/148 |

FOREIGN PATENT DOCUMENTS

| | | | |
|---|---|---|---|
| 0 299 703 | 1/1989 | European Pat. Off. . | |
| 0413198 | 2/1991 | European Pat. Off. | 374/141 |
| 2 320 528 | 3/1977 | France . | |
| 2 621 120 | 3/1989 | France | 374/208 |
| 0008175 | 12/1879 | Germany | 374/141 |
| 0 969 571 | 6/1958 | Germany | 136/233 |
| 40 14 502 | 5/1990 | Germany . | |
| 0 147 622 | 9/1983 | Japan | 136/233 |
| 0001510 | of 1883 | United Kingdom | 374/141 |
| 0 734 702 | 8/1955 | United Kingdom | 374/144 |
| 1 077 876 | 8/1967 | United Kingdom | 136/230 |
| 1 386 837 | 6/1972 | United Kingdom . | |

*Primary Examiner*—Christopher W. Fulton
*Attorney, Agent, or Firm*—George W. Neuner

[57] ABSTRACT

A thermocouple probe 10 suitable for use in a gas turbine engine comprises a thermocouple element 12 which is coaxially arranged inside a protective sheath 16. The thermocouple element 12 is resiliently supported by a helical member 18 which insulates the element 12 from deleterious vibrations induced in the sheath 16. In use, the thermocouple probe 10 projects through an aperture 30 in the casing 32 of a gas chamber 34. Vibrations in the probe 10 are further reduced by ensuring that the longitudinal axis AA of the probe is angularly offset from the central axis BB of the aperture 30, such that the outer periphery of the sheath 16 is in contact with the inner periphery of the aperture 30 in two diametrically opposite and axially offset locations.

8 Claims, 2 Drawing Sheets

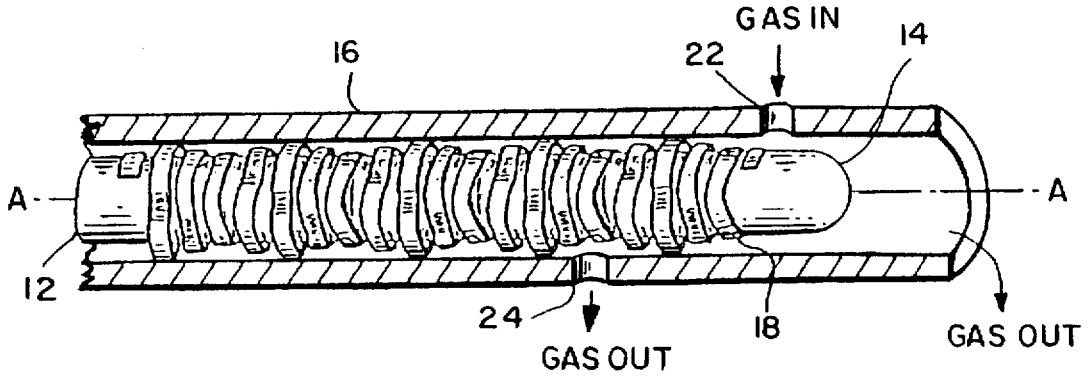
FIG. 1
FIG. 2
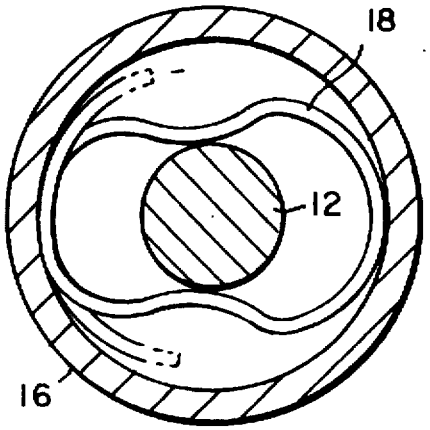
FIG. 3
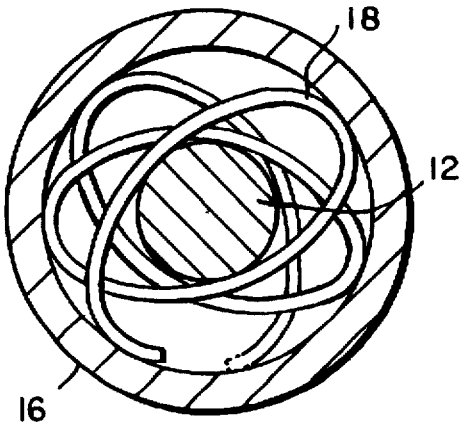

THERMOCOUPLE PROBE

Matter enclosed in heavy brackets [ ] appears in the original patent but forms no part of this reissue specification; matter printed in italics indicates the additions made by reissue.

This is a divisional of application[(s)] Ser. No. 08/142,184 filed on Oct. 26, 1993, now U.S. Pat. No. 5,423,610.

This invention relates to a thermocouple probe for sensing the temperature of a gas flowing through a chamber, and is more particularly but not exclusively concerned with a thermocouple probe suitable for use in gas turbine engines.

BACKGROUND

Thermocouple probes for use in gas turbine engines typically have to withstand high temperatures and high levels of vibration. At the same time, there is frequently a requirement for a long reach thermocouple, i.e. one which projects a long way into the flow duct which conveys the gas whose temperature is to be sensed, as well as a requirement for a fast response. Thus when designing an appropriate support for the thermocouple element, and an appropriate mounting arrangement for the thermocouple probe, all these factors have to be taken into account.

In gas turbine engine thermocouple probes, it is conventional to mount the thermocouple element within an outer protective sheath, to provide both strength and support. It is of course then necessary to provide some support between the thermocouple element and the protective sheath. With such an arrangement, problems caused by vibration and differential thermal expansion between the protective sheath and the thermocouple element, as well as the problem of ensuring coaxial alignment of the element within the sheath, all need to be solved, without compromising the desired fast response.

The manner in which a thermocouple probe is mounted on a gas turbine engine is critical to its survival. The Vibration levels attained in such an engine can be very high. In addition, the flow of gas through the duct may activate natural resonances in the protuberant part of the probe. Either of these factors can produce fluctuating stresses in the probe which may contribute to premature fatigue failure. It is clearly desirable to minimize such effects in an attempt to prolong the life of the probe.

SUMMARY OF THE INVENTION

According to the present invention in a first aspect, there is provided a thermocouple probe for sensing the temperature of a gas flowing through a chamber comprising an elongate thermocouple element disposed substantially coaxially within an elongate cylindrical sheath such that there exists a cavity around the thermocouple element, wherein the thermocouple element is resiliently supported within the sheath by a helical member, arranged coaxially with the thermocouple element, which has a plurality of turns of non-circular cross-section such that the helical member is alternately in contact with the inner periphery of the sheath and the outer periphery of the thermocouple element.

According to a first embodiment of the first aspect of the invention, the turns are substantially elliptical in cross-section and angularly offset such that the points of contact are circumferentially distributed around the inner periphery of the sheath and the outer periphery of the thermocouple element respectively.

According to a second embodiment of the first aspect of the invention, the helical member is corrugated such that the radial extremities of the corrugations produce the points of contact which are circumferentially distributed around the inner periphery of the sheath and the outer periphery of the thermocouple element.

In a preferred form, the helical member consists of a filament having a rectangular cross-section which is employed such that the thickness of the filament in a radial direction is less than the width in the axial direction. This provides the necessary support in the high temperature, high vibration conditions and overcomes the oxidation problems associated with wire of small cross section.

Typically, to ensure a fast response to temperature fluctuations, the sheath has a pair of apertures which permit the gas whose temperature is to be sensed to flow over the thermocouple element. The apertures are preferably elliptical in cross-section and aligned such that their major diameter is parallel with the longitudinal axis of the probe. This configuration is favourable since it is less detrimental to the integrity of the sheath in comparison to a circular aperture of identical cross-sectional area. The shape of the apertures is especially significant towards the root of the probe where tending stresses tend to be more prevalent.

The method of mounting a thermocouple probe in a gas stream can be of paramount importance to its survival. If the probe protrudes through the casing of a chamber, the gas flow will generate preferred fluctual vibrations in directions at 90° and parallel to the gas stream, but more specifically as defined by the structural details of the probe. If the mounting arrangement is not well defined, it is possible that there will be little damping of vibrations at this position. This is especially significant to the fundamental or cantilever mode of vibration.

According to the present invention in a second aspect, there is provided a method of mounting a thermocouple probe comprising a thermocouple element having a sensing tip, mounted in a rigid cylindrical sheath having an outwardly extending flange which is remote from the sensing tip, which is for sensing the temperature of a gas flowing through a chamber; wherein, when the sensing tip is inserted into the chamber through an aperture in the casing thereof and the flange abuts against the outer surface of the casing, the longitudinal axis of the probe and the central axis of the aperture are angularly offset and the outer surface of the sheath is in contact with the inner periphery of the aperture in two locations which are diametrically opposite and axially offset from one another.

In a preferred form, the angular offset is such that the longitudinal axis of the probe and the points of contact between the outer surface of the sheath and the inner periphery of the aperture are contained in a plane which is inclined at an angle to a principal direction of the flow of gas through the chamber. The plane is preferably inclined to the natural directions of vibration of the cantilever constituted by the thermocouple probe; namely in the direction of the gas flow and at 90° to the direction of the gas flow. Particularly preferably, the angle between the said plane and the principal direction of the flow of gas is 45° . Hence the two contact points are spaced at 45° with respect to the direction of the preferred fundamental modes of vibration and at 45° with respect to the gas flow direction. This is desirable since although vibration in line with the contact points will not be well damped, the thermocouple probe itself will not tend to vibrate naturally at 45° to its preferred direction.

In accordance with the present invention in a second aspect, there is provided an assemblage for sensing the temperature of a gas flowing through a chamber, comprising a thermocouple probe which includes a thermocouple element, having a sensing tip, mounted in a rigid cylindrical sheath having an outwardly extending flange which is remote from the sensing tip; wherein the thermocouple probe extends through an aperture in the casing of the chamber and the flange thereof abuts the outer surface of the casing such that the longitudinal axis of the thermocouple probe and the central axis of the aperture are angularly offset and the outer surface of the sheath is in contact with the inner periphery of the aperture in two locations which are diametrically opposite and axially offset from one another.

Typically, the central axis of the aperture in the casing is substantially perpendicular to the inner and outer surfaces of the casing.

According to a first embodiment of the second aspect of the invention, the angular offset between the two axes is produced by having the normal to the mating face of the flange inclined at an angle to the longitudinal axis of the probe. Alternatively, and according to a second embodiment, the desired effect may be achieved by having a stud-like protrusion on the mating face of the flange which is radially offset from the longitudinal axis of the probe.

BRIEF FIGURE DESCRIPTION

The different aspects of the invention, and embodiments thereof, will now be described by way of example with reference to the accompanying drawings in which:

FIG. 1 is a partially cut away schematic view of a thermocouple probe with a helical member according to a first embodiment of the first aspect of the invention;

FIG. 2 is a cross-sectional view of a thermocouple probe showing a turn of the helical member according to a first embodiment of the first aspect of the invention;

FIG. 3 is a cross-sectional view of a thermocouple probe showing a turn of the helical member according to a second embodiment of the first aspect of the invention;

DETAILED DESCRIPTION

Figure 4:
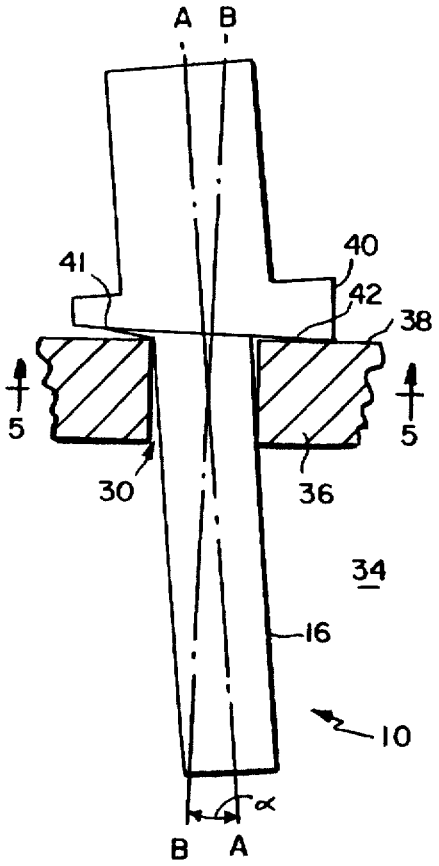
FIG. 4 shows an assemblage according to the second aspect of the invention.
Figure 6:
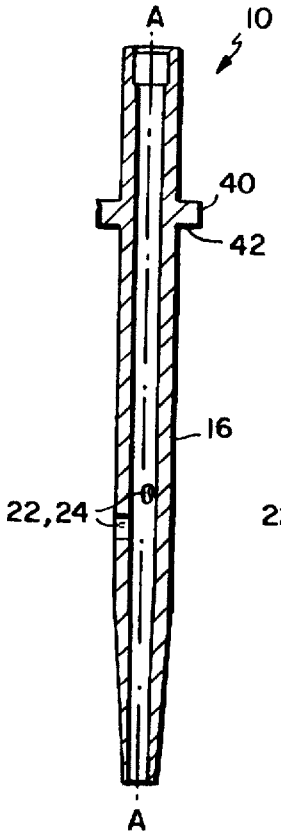
FIG. 6 shows the longitudinal cross-section of a thermocouple probe sheath according to a first embodiment of the second aspect of the invention.

FIG. 1 shows a device which may be used to sense the temperature of a gas flowing through a chamber. A thermocouple probe 10 has a longitudinal axis AA and comprises a thin elongate mineral-insulated thermocouple element 12 having a sensing tip 14. The thermocouple element 12 itself comprises a cylindrical outer jacket, typically of [Inconel] *INCONEL* 600, containing at least one pair of thermocouple wires. The wires are joined together to form a thermocouple junction at the sensing tip 14, but are otherwise insulated from each other and from the outer sheath by magnesium oxide powder. The outer diameter of the thermocouple element 12 is typically 4.5 mm, although smaller diameters are possible. For example, to enhance the speed of response, the diameter of the sensing tip 14 may be swaged down-to about 2.0 mm.

The thermocouple element 12 is disposed coaxially within a cylindrical protective sheath 16, which defines an annular space around the element. The sheath 16 is made of a material resistant to high temperatures, such as [Nimonic] *NIMONIC* 80 or Hastelloy X. The thermocouple element 12 is resiliently supported within the sheath 16, and held in coaxial alignment with it, by means of a helical member 18, which consists of a filament having a rectangular cross-section. The radial thickness of the filament is less than its width in the axial direction; and the radial thickness is also less than the radial separation between the thermocouple element 12 and the sheath 16. The helical member 18 is adapted to make alternate contact with the inner periphery of the sheath 16 and the outer periphery of the thermocouple element 12. The circumferential spacing of the contact areas is selected to give the desired support between the thermocouple element and the sheath. The contact areas spiral around the longitudinal axis of the probe 10 along the axial length of the helical member 18.

The helical member 18 may comprise rippled or corrugated turns, so that it makes contact with both the sheath 16 and the thermocouple element 12, the maximum amplitude of the corrugations in a radial direction being at least as great as the radial separation between the sheath 16 and the element 12 (FIG. 2). A helical member 18 composed of a corrugated filament may be produced by wrapping a strip of material around a mandrel having the desired varying cross-sectional shape. The dimensions are chosen such that on assembly the thermocouple element 12 is an interference fit within the helical member 18, and the helical member is an interference fit within the sheath 16.

Alternatively, the helical member 18 may comprise turns of elliptical cross-section (FIG. 3) Which obviates the need for a corrugated filament. The elliptical turns are dimensioned such that along a major diameter the helical member is in contact with the sheath 16, and that along a minor diameter the helical member is in contact with the thermocouple element 12. Adjacent elliptical turns are angularly offset so that the contact areas spiral around the longitudinal axis of the probe 10. A helical member 18 having offset elliptical cross-sections may be produced by firstly wrapping a strip of material around a mandrel having an elliptical cross-section, and then twisting the resulting helical structure about its longitudinal axis to progressively offset adjacent elliptical turns. In FIG. 3, the successive contact areas with the sheath 16 are shown more than 180° apart, if the angle is measured following the sense of rotation around the helical member 18. However, the degree of twist imparted to the structure to offset adjacent elliptical turns may be such that successive contact points are less than 180° apart.

The protective sheath 16 is provided with axially offset apertures 22, 24 which permit the gas flowing through the aforementioned chamber to pass over the sensing tip 14 of the thermocouple element. The apertures 22, 24 have elliptical cross-sections which are orientated such that the major diameters of the ellipses are aligned parallel to the longitudinal axis of the thermocouple probe 10. The extreme end of the sheath 16 adjacent the sensing tip 14 may be closed by a weld-on end cap (not shown).

Alternatively, the thermocouple element 12 may comprise two independent thermocouples, the first located at the sensing tip 14 of the probe 10 and the second located at about half way along the length of the element 12. In this case, two helical members 18 are employed, one on each side of the second (half-way) thermocouple junction. The sensing tip 14 actually protrudes slightly from the sheath 16 into the gas flow, and three apertures (one inlet and two outlet) are provided near the second junction to promote the desired fast response. When the thermocouple probe 10 is in use, the inlet aperture faces into the gas flow, while the exit apertures are circumferentially and axially offset and positioned just over 90° from the inlet aperture, so as to occupy areas of low pressure.

The materials used for the thermocouple element 12, the sheath 16 and the helical member 18 are selected to have optimum properties for their particular roles. If desired, different materials having slightly different thermal expansion coefficients could be selected for these components since any resulting differential expansion in a longitudinal direction may be accommodated in the helical member 18.

FIG. 4 shows an assemblage in which a thermocouple probe 10 is mounted through an aperture 30 in the casing 32 of a chamber 34. The central axis BB of the aperture is perpendicular to the inner surface 36 and outer surface 38 of the casing 32. The thermocouple probe 10 comprises a thermocouple element, having a sensing tip, which is protected inside a rigid sheath 16. The sheath 16 has an outwardly extending flange 40 which is remote from the sensing tip of the thermocouple element. The aperture 30 is larger than the cross-section of the sheath 16, but smaller than that of the flange 40.

The thermocouple probe 10 protrudes through the aperture 30 such that the sensing tip of the thermocouple element is located in the chamber 34. The mating surface 42 of the flange 40 abuts, and is biased against the outer surface 38 of the casing 32.

The mating surface 42 of the flange 40 is not perpendicular to the longitudinal axis of the probe 10. Instead, the mating surface normal is inclined at an acute angle to the longitudinal axis of the probe 10. The region 41 of the flange 40 diametrically opposite from the mating surface 42 is shaped so as not to interfere with the desired fit of the thermocouple probe 10 in the aperture 30. Therefore, since the mating surface 42 is positively biased flush against the outer surface 38 of the casing 32, there is an angular offset $\alpha$ between the longitudinal axis of the probe 10 and the central axis of the aperture 30. Furthermore, the angular offset is such that the outer surface of the sheath 16 makes contact with the inner periphery of the aperture 30 in two locations, diametrically opposite and axially offset from one another. The first point of contact is adjacent the outer surface 38 of the casing; and the second point of contact is adjacent the inner surface 36. Hence in total, three points of contact are established in the assemblage. The first and second are between the outer surface of the sheath 16 and the inner periphery of the aperture 30; and the third is the high point between the mating surface 42 and the outer surface 38 of the casing 32.

Furthermore, the points of contact are positioned so that a component of any force exerted on the probe by the flow of gas through the chamber tends to increase the contact pressure exerted by the sheath on the inner periphery of the aperture.

Figure 5:
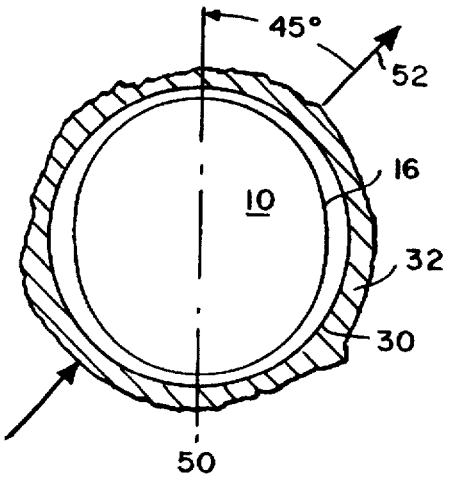
FIG. 5 is a schematic diagram along line 5—5 of FIG. 4 illustrating the orientation relationship between the thermocouple probe and the principal direction of gas flow.

The longitudinal axis of the probe 10 and the two points of contact between the inner, periphery Of the aperture 30 and the outer periphery of the sheath 16 define a plane. In FIG. 5, the plane is perpendicular to the page and intersects the page along the trace line 50. The central axis of the aperture may also lie in the plane. The gas which flows through the chamber 34 flows in a principal direction 52, viz. a gas stream in the flow duct of a turbine engine. There exists a preferred orientation relationship between the trace line 50 and the principal direction 52. The trace line 50 is inclined substantially at 45° to the principal direction 52.

Figure 7:
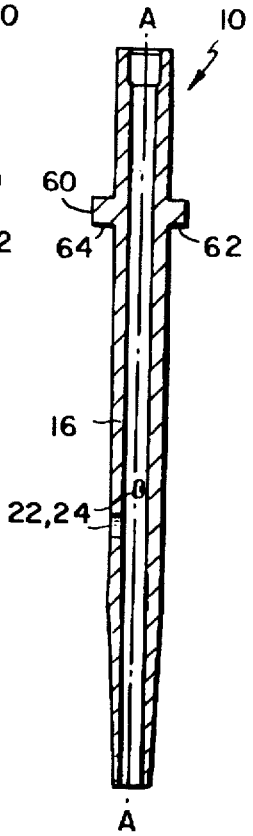
FIG. 7 shows the longitudinal cross-section of a thermocouple probe sheath according to a second embodiment of the second aspect of the invention.

The angular offset between the longitudinal axis of the probe 10 and the central axis of the aperture 30 may be achieved by using the alternative flange construction shown in FIG. 7. The flange 60 has a stud-like protrusion 62 on the mating surface 64. The protrusion 62 is radially offset from the longitidinal axis of the probe. When the flange 60 is biased against the outer surface 38 of the casing 32, the protrusion 62 prevents the longitudinal axis of the probe from being parallel to the central axis of the aperture.

It will be appreciated that various modifications can be made to the described embodiments of the invention. In particular, the various dimensions and materials mentioned in relation to the described embodiments are examples only.

We claim:

1. A method for mounting a sensing probe in a fluid chamber, said sensing probe being exposed to fluid flowing through said chamber, comprising the steps of:

providing said sensing probe, said sensing probe comprising a rigid cylindrical body and a flange extending outwardly from said rigid cylindrical body;

providing an aperture in the casing of said chamber, said aperture being such that said flange is too big to pass therethrough;

inserting said sensing probe into said aperture such that said rigid cylindrical body projects into said chamber and such that said flange abuts against the outer surface of the casing of said chamber; and positioning said sensing probe such that the longitudinal axis of said sensing probe and the central axis of said aperture are angularly offset, with the outer surface of said rigid cylindrical body in contact with the inner periphery of said aperture in [only] two locations which are diametrically opposite and axially offset from one another.

2. A method according to claim 1 wherein the angular offset is such that the longitudinal axis of said sensing probe and the two points of contact between the outer surface of said rigid cylindrical body and the inner periphery of said aperture are contained in a plane which is inclined at an angle to a principal direction of flow of fluid through said chamber and which is a non-preferred plane of vibration for said sensing probe.

3. A method according to claim 2 wherein said angle between said plane and said principal direction of flow of fluid is 45°.

4. A method according to claim 2 or 3 wherein said sensing probe is positioned such that at least a component of any force exerted thereon by the fluid flowing through said chamber increases the contact pressure exerted by said rigid cylindrical body on the inner periphery of said aperture.

5. An assemblage consisting of a sensing probe mounted in a chamber, said chamber having a casing with an aperture therein for receiving said sensing probe, said sensing probe comprising a rigid cylindrical body and a flange extending outwardly from said rigid cylindrical body, said flange being too big to pass through said aperture, wherein said rigid cylindrical body projects into said chamber through said aperture with said flange having a mating face which abuts the outer surface of said casing, such that the longitudinal axis of said sensing probe and the central axis of said aperture are angularly offset, with the outer surface of said rigid cylindrical body in contact with the inner periphery of said aperture in [only] two locations which are diametrically opposite and axially offset from one another.

6. An assemblage according to claim 5 wherein the central axis of said aperture is substantially perpendicular to the inner and outer surfaces of the casing of said chamber adjacent said aperture.

7. An assemblage according to claim 6 Wherein the normal to the mating face of the flange is inclined at an angle to the longitudinal axis of said sensing probe.

8. An assemblage according to claim 6 wherein the mating face of the flange has a stud-like protrusion, said stud-like protrusion being radially offset from the longitudinal axis of said sensing probe.

* * * * *